United States Patent [19]

Blawert et al.

[11] 4,273,203

[45] Jun. 16, 1981

[54] APPARATUS FOR OVERLOAD PROTECTION OF PRECISION SCALES

[75] Inventors: Dieter Blawert, Göttingen; Karl-Heinz Rademacher, Bovenden; Walter Södler, Pforzheim-Bü., all of Fed. Rep. of Germany

[73] Assignee: Sartorius GmbH, Göttingen, Fed. Rep. of Germany

[21] Appl. No.: 53,762

[22] Filed: Jul. 2, 1979

[30] Foreign Application Priority Data

Jul. 11, 1978 [DE] Fed. Rep. of Germany ....... 2830345

[51] Int. Cl.³ ............................................. G01G 21/10
[52] U.S. Cl. ..................................... 177/187; 177/229
[58] Field of Search ............... 177/156, 189, 187, 184, 177/210 EM, 212, 229

[56] References Cited

U.S. PATENT DOCUMENTS

| 4,058,179 | 11/1977 | Price ................................. 177/187 X |
| 4,136,750 | 1/1979 | Strickler ............................. 177/189 |

Primary Examiner—Joseph W. Hartary
Attorney, Agent, or Firm—Otto John Munz

[57] ABSTRACT

Apparatus for overload protection of precision or analysis scales having a parallel-guided load support with limit stops to limit the range of movement thereof, comprises an auxiliary parallel guide connection between the weighing pan and load support, and resiliently yieldable means connected between the weighing pan and load support to yield under excessive or improperly placed loads and thus protect the scale mechanism. The resiliently yieldable means may comprise the auxiliary parallel guide or may comprise a separate means.

8 Claims, 4 Drawing Figures

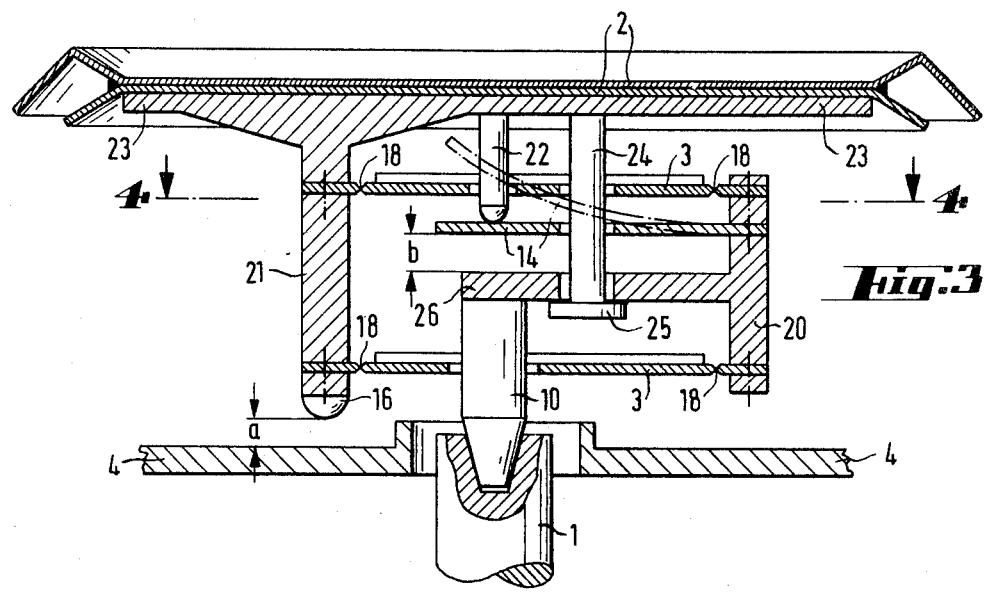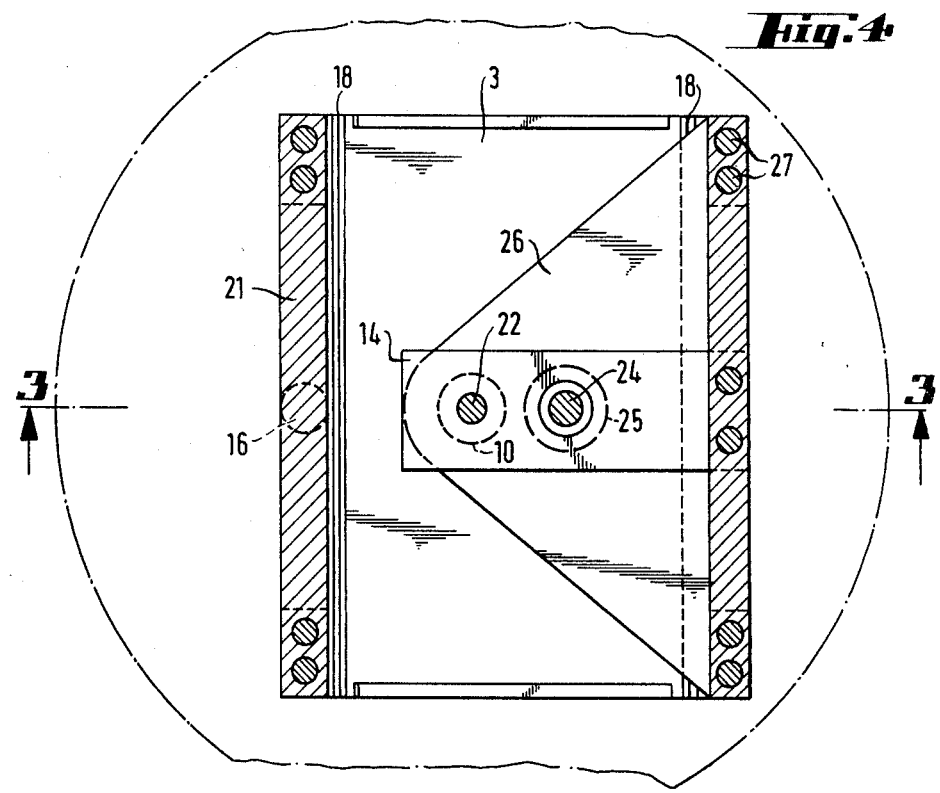

APPARATUS FOR OVERLOAD PROTECTION OF PRECISION SCALES

BACKGROUND OF THE INVENTION

The invention relates to an overload protection device for a scale, particularly a precision scale or analysis scale, the weighing scale of which is arranged at the upper end of a parallel-guided load support coupled with a transducer and having limit stops providing limited movement of the load support, and wherein a pre-biased, resilient element is arranged in the mechanical connection between the weighing pan and load support, the spring path of which is greater than the free path of the weighing pan up to a stop in the scale, thus protecting the scale mechanism from overloads.

This type of top pan precision scale operates mechanically with the aid of a lever arrangement and adjustable sets of weights, or electromechanically with the aid of a transducer according to the electromagnetic force compensation principle, in conjunction with the oscillating string principle or with extension measuring strips. In all cases, the load support carrying the weighing pan performs a vertical movement of a few tenths of millimeters or a few millimeters before striking a stop in the housing, which is intended to protect the scale mechanism from overloads. Such overloads occur, for example, when loads are placed too hard on the weighing pan, too much in the peripheral area, or otherwise improperly positioned.

PRIOR ART

In a known overload protection device of the above-mentioned construction, a star-shaped spring is used, being arranged between the weighing pan and the load support. This resilient star-shaped component comprised of leaf spring arms arranged about the support pin of the weighing pan does not demonstrate the desired results for eliminating overloads placed in the center of the weighing pan. When the load is arranged eccentrically, each star finger must be able to assume the full possible load, and thereby the centrally located load increases almost corresponding to the number of star fingers.

SUMMARY OF THE INVENTION

The basic objective of the invention, therefore, is to further develop an overload protection device according to the foregoing, with simple means in such a manner that both central and peripheral overloads and impacts acting on the weighing pan are completely cushioned and not transferred into the system.

This objective is achieved according to the invention by means of an auxiliary parallel guide which itself may comprise an elastic member or may be in addition to such elastic member, and which couples the weighing pan semi-rigidly with the load support under proper load conditions, and elastically yields under improper load conditions.

BRIEF DESCRIPTION OF THE DRAWINGS

FIG. 3 is a vertical section taken along line 3—3 in FIG. 4 of a further exemplary embodiment; and FIG. 4 is a horizontal section taken along line 4—4 in FIG. 3.

DETAILED DESCRIPTION OF THE PREFERRED EMBODIMENTS

Figure 1:
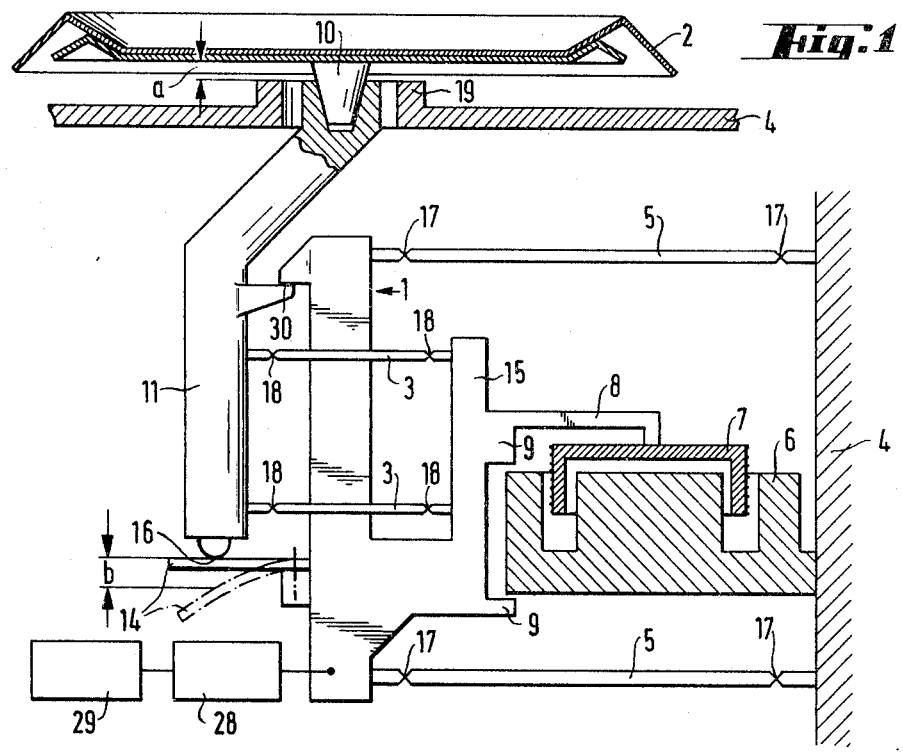
FIG. 1 is a schematic illustration in vertical section through one form of weighing apparatus of the invention.

The overload protection device of the present invention is used in a top pan precision or analysis scale with electromagnetic load compensation. The load support 1 is guided vertically at rigid points of the housing 4 with the aid of a parallel guide 5 and 5', namely, in a range determined by the stops 9. The vertical path of the load support 1 is thus only a few tenths of a millimeter. The parallel guide is formed by an upper guide 5 and a correspondingly formed lower guide 5', which are trapezoidal or triangular in plan view and which are connected by bending joints 17 and 17' with the rigid points of the housing 4 and the load support 1. The electromagnetic load compensation takes place in a customary manner with the aid of a winding or coil holder 8 with winding or coil 7, which enters into the air space of a permanent magnet 6, which is rigidly supported in the housing 4. The electrical portion of the scale is schematically illustrated by the transducer 28 and the display device 29 coupled therewith.

Normally, the upper end of the load support 1 penetrates the upper portion of the housing 4 without making contact and the conical weighing pan pin 10 directly supports the weighing pan 2.

Figure 2:
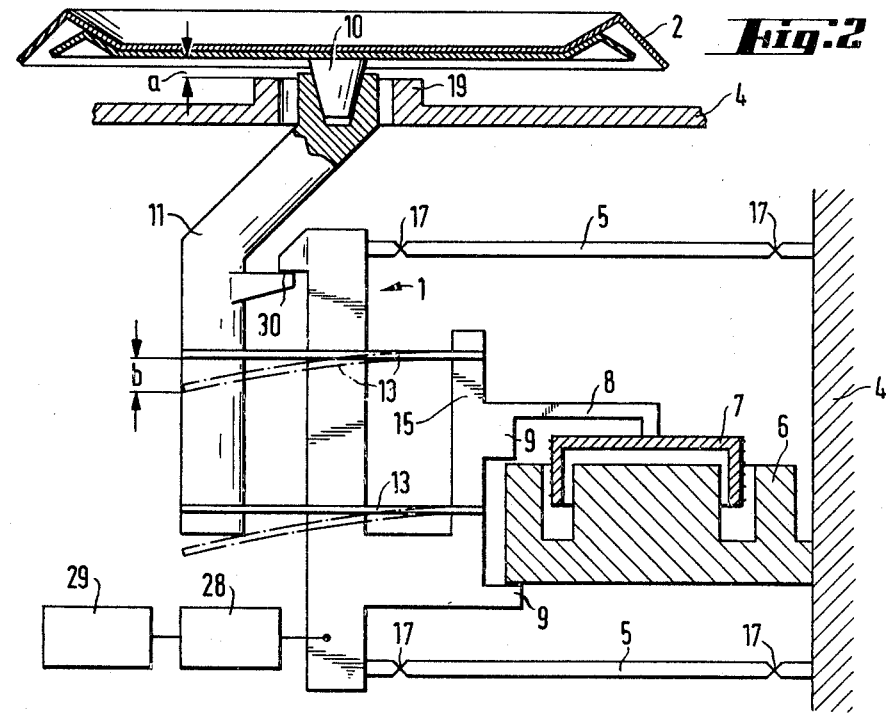
FIG. 2 is a corresponding illustration of a variation of the auxiliary parallel guide shown in FIG. 1.

In the exemplary embodiment according to FIGS. 1 and 2, however, the load support 1 extends into a weighing pan support 11, which is coupled to a part 15 of the load support 1 with the aid of an auxiliary parallel guide 3 and 3'.

In the exemplary embodiment according to FIG. 1, this parallel guide consists of an upper guide 3 and a corresponding lower guide 3', which are triangular or trapezoidal in plan view and which have bending points 18 and 18'. A pre-biased spring 14 projects into the set point or intended position and presses the weighing pan support 11 against the stop 30 on the load support 1 by means of the support point 16. The leaf spring 14 is designed in such a manner that it acts in the range of the highest load allowable for the scale as a rigid element and only deflects into the position shown by the broken line in FIG. 1 when there is a slight exceeding of the highest load. This causes the weighing pan support 11, also parallel guided by the auxiliary parallel guide 3 and 3', to deflect downwardly, whereby the underside of the weighing pan 2 is supported on the stop 19 in the housing, so that the damaging loads are not transferred into the mechanical system.

The possible vertical path a of the weighing pan 2 up to the stop 19 in the housing is thereby smaller than the possible path of the leaf spring 14 in its downward deflection.

If a load lying in the weighing range of the scale is placed on the weighing pan 2, the connection 11, 14, 3, 3', 15 acts as a semi-rigid coupling, and when the highest allowable weighing range is exceeded, it acts practically as an elastically yielding coupling.

In the exemplary embodiment according to FIG. 2, which corresponds with the exemplary embodiment according to FIG. 1 in the basic components, leaf spring elements are used as upper guide 13 and lower guide 13', which assume both the purpose of the auxiliary parallel guide 3 and the purpose of the leaf spring 14 according to FIG. 1. The leaf springs 13, 13' are also pre-biased into the set point position, whereby they support the weighing pan support 11 against the stop 30 on the load support 1. The resistance force of the leaf springs 13, 13' is designed so that they semi-rigidly couple the weighing pan 2 with the load support 1 in the weighing range of the scale and elastically yield above the weighing range. Here, too, the weighing pan support 11 deflects downwardly by means of the auxiliary parallel guide 13, 13' when the weighing range is exceeded, so that the weighing pan 2 sits on the stop 19 in the housing. In this manner the system is not unacceptably overloaded.

In the two exemplary embodiments, the auxiliary parallel guide 3, 3' or 13, 13' is a part of the load support 1.

In the exemplary embodiment according to FIGS. 3 and 4, the auxiliary parallel guide 3, 3' is part of the weighing pan 2 or of the weighing pan support 20 or 26, which ends in the weighing pan support pin 10. As indicated in FIG. 3, the upper end of the load support 1 ends directly in the housing opening and supports the weighing pan support pin 10 directly. Except for the elimination of elements 11 and 13 from the embodiment shown in FIG. 3, the load support 1 is formed according to FIG. 2 and is also connected with the parallel guide 5 and with the electromagnetic load compensation.

In the exemplary embodiment according to FIGS. 3 and 4, the weighing pan 2 is supported on the plate 23 of the weighing pan support 21, 20, which, with the aid of the upper and lower guides 3, 3', form a hinged square. The support 20 has a support arm 26, which ends in the weighing pan support pin 10. A counter mount 24 projects through the support arm 26, and engages beneath the support arm with a plate-shaped resisting support or retainer 25, and is connected at the upper side with the plate 23. The plate 23 is supported by a pin 22 on the pre-biased leaf spring 14, which assumes the position shown by the broken line in FIG. 3 when in the non-biased condition. Here, too, the strength of the leaf spring 14 is designed so that the joint square 21, 3, 20 is semi-rigid in the weighing range.

If a load placed on the weighing pan 2 exceeds the design load of the scale, the leaf spring 14 gives and the plate 23 with support 21 move vertically toward the scale housing 4 and are supported with the stop device 16, so that the load support 1 is not overloaded. The upper and lower guides 3, 3' thereby pivot about the right side bending joints 18, 18' on the support 20.

As can be seen from FIG. 4, the upper and lower guides 3 and 3' of the auxiliary parallel guide consists of a flat material extending over the entire width of the supports 20, 21, which is clamped to the supports 20 and 21 by means of clamping screws 27. Intended bending points extending over the entire width form the bending joints 18, 18'.

As becomes clear from FIG. 3, the free path b of the leaf spring 14 is kept greater than the path a of the load pan 2 up to the stop defined by the housing.

Even with so-called corner loads, the auxiliary parallel guide 3, 3' or 13, 13' assures a precise guiding of the weighing pan 2 without the pan being able to tip laterally.

The upper and lower guides 3 and 3' can also be formed in this embodiment as leaf spring elements, as described under FIG. 2. Accordingly, the pin 22 and the leaf spring 14 would then be eliminated.

The path of the load support 1 in such electromagnetic compensating scales is only a few tenths of a millimeter, while in mechanical scales it can lie in the range of 4–10 mm. In both cases, the principle of the described overload protection is effective. By proper selection of the spring 14 or 13 the overload protection device can be adjusted to the scale-specific overloads of the individual scale types.

What is claimed is:

1. An overload protection device for a scale having a weighing pan supported on the upper end of a parallel guided load support coupled with a transducer having limited movement, wherein auxiliary parallel guide means is connected between the weighing pan and load support, said auxiliary parallel guide means including a pre-biased resilient element connected between the weighing pan and load support and having a spring path which is greater than the free travel of the weighing pan up to a stop, said resilient element coupling the weighing pan with the load support in a semi-rigid manner for movement together under proper load conditions and in an elastically yielding manner under improper load conditions, said auxiliary parallel guide means comprising the resilient element.

2. An overload protection device as in claim 1, wherein the auxiliary parallel guide means comprises an upper guide and a lower guide.

3. An overload protection device as in claim 1, characterized in that the upper and lower guides are formed as leaf springs.

4. An overload protection device as in claim 2, wherein the weighing pan is supported on a weighing pan support, and the weighing pan support, the upper and lower guides, and the load support define a guide square or parallelogram linkage, characterized in that the guide square is supported on at least one spring.

5. An overload protection device as in claims 1, 2, 3 or 4, characterized in that the auxiliary guide is part of the weighing scale.

6. An overload protection device as in claims 1, 2, 3 or 4, characterized in that the auxiliary parallel guide is formed by a weighing pan supported extending parallel to the vertical axis of the load support and by the upper and lower guides connected therewith and with the load support, and that the end of the weighing pan support with the weighing pan ends in the vicinity of the system axis of the load support.

7. An overload protection device for a scale having a weighing pan supported on the upper end of a parallel guided load support coupled with a transducer having limited movement, wherein auxiliary parallel guide means is connected between the weighing pan and load support, said auxiliary parallel guide means including a pre-biased resilient element connected between the weighing pan and load support and having a spring path which is greater than the free travel of the weighing pan up to a stop, said resilient element coupling the weighing pan with the load support in a semi-rigid manner for movement together under proper load conditions and in an elastically yielding manner under improper load conditions;

said weighing pan being supported on a weighing pan support, and the weighing pan support, the upper and lower guides, and the load support define a guide square or parallelogram linkage, characterized in that the guide square is supported on at least one spring.

8. An overload protection device for a scale having a weighing pan supported on the upper end of a parallel guided load support coupled with a transducer having limited movement, wherein auxiliary parallel guide means is connected between the weighin pan and load support, said auxiliary parallel guide means including a pre-biased resilient element connected between the weighing pan and load support and having a spring path which is greater than the free travel of the weighing pan up to a stop, said resilient element coupling the weighing pan with the load support in a semi-rigid manner for movement together under proper load conditions and in an elastically yielding manner under improper load conditions;

a weighing pan support pin arranged between the weighing pan and the load support, and characterized in that the auxiliary parallel guide is formed by a first weighing pan support associated with the weighing pan support pin and a second weighing pan support parallel to the first support and associated with the weighing pan and by two parallel bending plates which comprise the upper and lower guides and which have hinge points and the ends thereof are clamped in the first and second weighing pan supports, and that the second weighing pan support is supported on the resilient element by means of a pin, said resilient element being clamped in the first weighing pan support, and that the second weighing pan support has a retainer which acts against the resilient element and is engaged with the first weighing pan support.

* * * * *